(12) United States Patent
Fanson (10) Patent No.: US 7,830,998 B2
(45) Date of Patent: Nov. 9, 2010

(54) APPROXIMATE LINEAR FM SYNCHRONIZATION SYMBOLS FOR A BANDWIDTH CONFIGURABLE OFDM MODEM

(75) Inventor: John Fanson, Ottawa (CA)

(73) Assignee: Edgewater Computer Systems, Inc., Kanata, Ontario (CA)

( * ) Notice: Subject to any disclaimer, the term of this patent is extended or adjusted under 35 U.S.C. 154(b) by 1117 days.

(21) Appl. No.: 11/332,395

(22) Filed: Jan. 17, 2006

(65) Prior Publication Data

US 2007/0165727 A1 Jul. 19, 2007

(51) Int. Cl.
  H04L 7/00 (2006.01)
  H04B 3/46 (2006.01)
  H04B 1/00 (2006.01)
  H04J 3/16 (2006.01)
(52) U.S. Cl. .................. 375/354; 375/227; 375/139; 370/466
(58) Field of Classification Search .............. 375/260, 375/139, 227, 354; 370/466
See application file for complete search history.

(56) References Cited

U.S. PATENT DOCUMENTS

| | | | | |
|---|---|---|---|---|
| 6,317,456 B1 * | 11/2001 | Sayeed | | 375/227 |
| 6,459,679 B1 * | 10/2002 | Kim | | 370/208 |
| 6,556,557 B1 | 4/2003 | Cimini | | 370/342 |
| 6,925,128 B2 | 8/2005 | Corral | | 375/260 |
| 6,950,389 B2 | 9/2005 | Weerackody | | 370/210 |
| 7,136,393 B2 * | 11/2006 | Owens et al. | | 370/466 |
| 7,170,440 B1 * | 1/2007 | Beckner | | 342/22 |
| 2002/0009125 A1 * | 1/2002 | Shi | | 375/139 |
| 2002/0009132 A1 | 1/2002 | Miller | | 375/222 |
| 2002/0150036 A1 | 10/2002 | Weerackody | | 370/208 |
| 2002/0188908 A1 | 12/2002 | Yonge | | 714/779 |
| 2003/0018840 A1 * | 1/2003 | Chandler et al. | | 710/100 |
| 2003/0026201 A1 * | 2/2003 | Arnesen | | 370/210 |
| 2003/0081705 A1 | 5/2003 | Miller | | 375/346 |
| 2003/0103584 A1 * | 6/2003 | Bjerke et al. | | 375/340 |
| 2003/0133433 A1 | 7/2003 | Cimini | | 370/342 |
| 2003/0161392 A1 | 8/2003 | Miller | | 375/222 |
| 2004/0013131 A1 * | 1/2004 | Owens et al. | | 370/466 |
| 2004/0015630 A1 * | 1/2004 | Boolos et al. | | 710/300 |
| 2004/0064493 A1 * | 4/2004 | Kulkarni et al. | | 708/404 |
| 2004/0086054 A1 | 5/2004 | Corral | | 375/260 |
| 2004/0136448 A1 | 7/2004 | Miller | | 375/222 |
| 2004/0140918 A1 | 7/2004 | Moore | | 341/58 |
| 2004/0141548 A1 | 7/2004 | Shattil | | 375/146 |
| 2004/0240588 A1 | 12/2004 | Miller | | 375/340 |
| 2005/0141603 A1 | 6/2005 | Miller | | 375/222 |
| 2005/0147025 A1 | 7/2005 | Auer | | 370/203 |
| 2005/0157811 A1 * | 7/2005 | Bjerke et al. | | 375/267 |
| 2005/0193047 A1 * | 9/2005 | Fu et al. | | 708/300 |
| 2005/0195906 A1 | 9/2005 | Showmake | | 375/260 |

(Continued)

FOREIGN PATENT DOCUMENTS

| EP | 1278323 A1 | 1/2003 |
|---|---|---|
| WO | 2004/109475 A2 | 12/2004 |
| WO | WO 2005/055543 | 6/2005 |

Primary Examiner—Mohammad H Ghayour
Assistant Examiner—Sarah Hassan
(74) Attorney, Agent, or Firm—Ogilvy Renault LLP (57) ABSTRACT

A communications system permits bandwidth configurability using a linear frequency modulated (LFM) waveform for transmitter/receiver synchronization. The system permits enhancement of MIL-STD-1553 data buses, and is likewise applicable to any bandwidth-configurable modem.

18 Claims, 12 Drawing Sheets

U.S. PATENT DOCUMENTS

2007/0165727 A1* 7/2007 Fanson ........................ 375/260
2007/0255884 A1* 11/2007 Kinstler ...................... 710/315
2007/0268973 A1* 11/2007 Fanson ........................ 375/257
2008/0215652 A1* 9/2008 Lin et al. .................... 708/400

* cited by examiner

APPROXIMATE LINEAR FM SYNCHRONIZATION SYMBOLS FOR A BANDWIDTH CONFIGURABLE OFDM MODEM

CROSS-REFERENCE TO RELATED APPLICATIONS

This is the first application filed for the present invention.

MICROFICHE APPENDIX

Not Applicable.

TECHNICAL FIELD

The invention relates to orthogonal frequency division multiplexing (OFDM) based data communications and, in particular, to symbol and frame synchronization signals for a bandwidth configurable OFDM modem.

BACKGROUND OF THE INVENTION

MIL-STD-1553b is a 30-year-old standard that defines electrical and signaling characteristics for communications over avionics buses used in military and civilian aircraft, as well as in other applications (ships, trains, shuttles, space stations, etc.). A Manchester II bi-phase signaling scheme is used over shielded twisted pair cabling. That signaling scheme does not efficiently utilize potential bandwidth available on the bus.

OFDM is a communications protocol that may be used to more optimally utilize the available bandwidth unused by the 1553b signaling. Of course, bus coupler type, network topology and filtering of the Manchester II signaling affect how much bandwidth is available for an "overlay" OFDM communications system.

Figure 1:
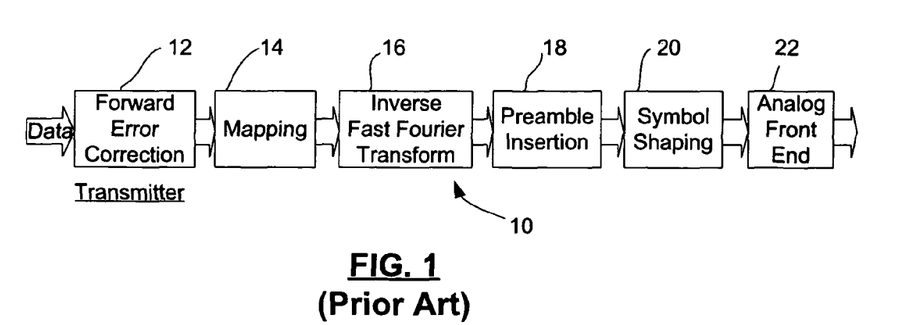
FIG. 1 is a schematic diagram of an exemplary prior art OFDM transmitter.
Figure 3:
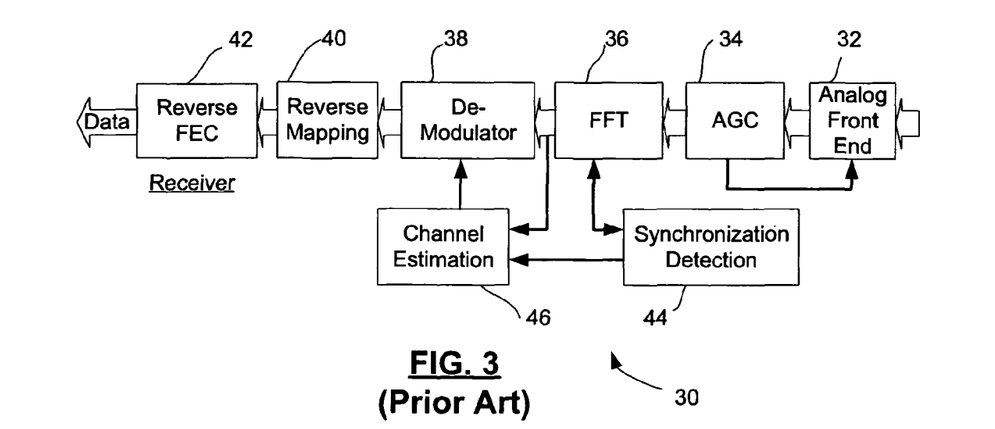
FIG. 3 is a schematic diagram of an exemplary prior-art OFDM receiver.

An OFDM based communications system can be described by transmitter 10 and receiver 30 components shown in FIGS. 1 and 3. The transmitter 10 includes forward error correction (FEC) 12 applied to an input data bit stream, followed by a mapping 14 of encoded bits to frequency domain sub-carriers, which are transformed to a time domain digital signal by an inverse fast Fourier transform (IFFT) 16, which is an efficient implementation of an inverse discrete Fourier transform (IDFT). FEC 12 may be a Reed-Solomon, convolutional, or any other type of forward error correction encoding scheme.

Before the digital signal is converted to an analog signal for transmission to the receiver 30, a preamble, inserted by preamble insertion 18, includes a number of synchronization symbols 24 (shown in FIG. 2) which are pre-pended to the transmission sequence to permit synchronization of the transmitted waveform at the receiver 30, and to facilitate automatic gain control (AGC) and channel response estimation. A cyclic prefix is usually added to the OFDM symbols, which are appropriately shaped (windowed and/or filtered) by symbol shaping 20 before conversion to an analog signal by an analog front end (AFE) 22. The AFE 22 includes a digital-to-analog converter (DAC), appropriate analog filtering and may also include an IF/RF mixing stage to convert the signal to higher frequencies.

Figure 2:
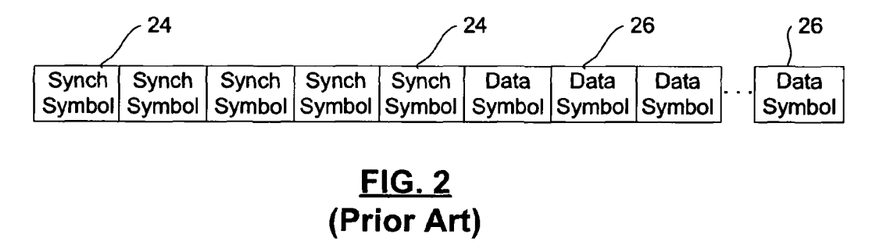
FIG. 2 is a schematic diagram of an exemplary prior art OFDM transmission sequence.

An exemplary OFDM transmission sequence is shown in FIG. 2. As can be seen, a predetermined number of synchronization symbols 24 are prepended to data symbols 26.

At the receiver 30, the analog signal is filtered and converted to a digital signal by an analog-to-digital converter (ADC), not shown, in a receiver analog front end 32. The appropriate RF/IF stages are used to convert the received signal to a baseband signal in a manner well known in the art. An automatic gain control 34 controls input signal level based on power metrics estimated from the synchronization symbols 24. A fast Fourier transform (FFT) which is an efficient implementation of the discrete Fourier transform (DFT) 36 is applied to the sampled signal, with the timing of the FFT based on detection and timing estimations derived from the synchronization symbols 24. A channel estimation 46 is calculated using the synchronization symbols detected by the synchronization detection unit 44 and is used by the demodulator 38 to remove effects of the channel. This process, called channel equalization, is performed in the frequency domain. An inverse mapping function 40 is used to convert demodulated frequency domain sub-carriers to coded data bits followed by forward error correction (FEC) decoding 42, which corrects bit errors when possible and passes the decoded data bits to higher communications layers.

In addition to using OFDM to utilize unused bandwidth on a 1553b bus, it has been recognized as desirable to be able to configure multiple independent networks on the same bus, so that groups of communications devices can be respectively allocated a certain proportion of the available spectrum. It would also be useful for some devices (a host bus controller, for example) to be able to communicate to devices associated with any of these independent networks. In order to accomplish these objectives, the synchronization signaling component of an OFDM-based communications system must have an efficient implementation and be configurable "on the fly", as well as having other required properties. These properties include: a small transmit peak to average power for all configurations; and cross-correlation properties such that a receiver configured to operate in one frequency band will not detect as a valid synchronization signal leakage energy of a transmitter configured to operate in another frequency band.

Linear FM (LFM) signals are used in communications systems for the transmission of data as well as for synchronization preambles, automatic gain control (AGC) and channel response estimation. Advantages of LFM signals include low peak to average power for transmission using limited resolution digital to analog converters and limited linearity amplifiers, and having a narrow correlation peak for matched filter reception.

OFDM multi-carrier communications schemes, such as HomePlug® Version I and AV, often synthesize a LFM signal by storing frequency domain coefficients in a look up table (LUT) and then transforming to the time domain using an IDFT. Each LUT coefficient corresponds to an OFDM sub-carrier and each coefficient has a non-zero value for sub-carriers ranging over the sweep of the LFM signal. This system can be configured to sweep over any desired sub-band by zeroing LUT coefficients corresponding to sub-carriers outside the sub-band. However this system suffers from the drawback that when configured for a sub-band, the time domain LFM sweep will have most of its power concentrated in the time segment corresponding to the sub-band, significantly increasing the peak to average power ratio of the signal. For example, if the system is configured to sweep the first half of the LFM band by zeroing the upper half of the coefficients, the first half of the LFM waveform will sweep over this sub-band and the second half will be close to zero in amplitude. A bandwidth-configurable OFDM modem that overcomes at least one of these shortcomings would be highly desirable.

SUMMARY OF THE INVENTION

The instant invention is designed to enhance MIL-STD-1553 data buses but is likewise applicable to any bandwidth configurable communications system requiring an LFM waveform to be generated and therefore not restricted to an OFDM modem. The invention provides a communications system that permits bandwidth configurability using a linear frequency modulated (LFM) waveform for transmitter/receiver synchronization.

In accordance with one aspect of the present invention, a method of generating LFM synchronization symbols for a bandwidth-configurable modem includes using the equation $$x'(n) = e^{j\pi \frac{vn^2}{N^2} + j2\pi \frac{k_0 n}{N}}$$

where x'(n) is the discrete time LFM waveform; N is the length of the waveform in samples; n=0 to N−1; v is the number of frequency bins over which the signal is swept; and $k_0$ is the index of the sub-carrier corresponding to the start of the sweep.

In accordance with another aspect of the present invention, a method of generating synchronization symbols for a bandwidth-configurable modem includes using the approximation equation $$X'(k+k_0)_{modN} \approx X''(k+k_0)_{modN}$$
$$= \begin{cases} \frac{N}{\sqrt{v}} e^{-j\frac{\pi}{v}k^2 + j\frac{\pi}{4}} & k=0,1,\ldots,v-1 \\ 0 & \text{otherwise} \end{cases}$$

where: X'(k) is the DFT of the LFM waveform x'(n); N is the number of sub-carrier frequencies; k=0 to N−1; v is the number of sub-carriers over which the signal is swept, and, $k_0$ is the index of the sub-carrier corresponding to the start of the sweep; and using an inverse fast Fourier transform (IFFT) to convert to the time domain before the waveform is transmitted.

In accordance with yet another aspect of the present invention, a bandwidth-configurable modem includes logic circuits that generate the synchronization symbols in a time domain using the equation $$x'(n) = e^{j\pi \frac{vn^2}{N^2} + j2\pi \frac{k_0 n}{N}}$$

where: x'(n) is the discrete time LFM waveform; N is the length of the waveform in samples; n=0 to N−1; v is the number of frequency bins over which the signal is swept; and $k_0$ is the index of the sub-carrier corresponding to the start of the-sweep.

In accordance with a further aspect of the present invention, a bandwidth-configurable modem includes logic circuits that generate the synchronization symbols in the frequency domain by using the approximation equation:

$$X'(k+k_0)_{modN} \approx X''(k+k_0)_{modN}$$
$$= \begin{cases} \frac{N}{\sqrt{v}} e^{-j\frac{\pi}{v}k^2 + j\frac{\pi}{4}} & k=0,1,\ldots,v-1 \\ 0 & \text{otherwise} \end{cases}$$

where: X'(k) is the DFT of the LFM waveform x'(n); N is the number of sub-carrier frequencies; k=0 to N−1; v is the number of frequency bins over which the signal is swept; and $k_0$ is the index of the sub-carrier corresponding to the start of the sweep; and logic circuits for performing an inverse fast Fourier transform (IFFT) for converting sub-carrier signals to the time domain before the waveform is transmitted.

In the above equations, v is understood to be a positive integer and consequently the equations describe an LFM sweep going from low to high frequency. However, with minor modifications obvious to one skilled in the art, the equations can be modified to describe an LFM sweeping from high to low frequency.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Linear FM Synchronization Symbols

It can be demonstrated that for the following complex sampled LFM signal (quadratic phase modulation), $$x(n) = e^{j\frac{\pi}{N}n^2} \qquad \text{Equation 1}$$

the discrete Fourier transform (DFT) defined by $$X(k) = \sum_{n=0}^{N-1} x(n) e^{-j2\pi\frac{kn}{N}} \quad k = 0, 1, \ldots N-1 \qquad \text{Equation 2}$$

is given by $$X(k) = \sqrt{N}\, e^{-j\frac{\pi}{N}k^2 + j\frac{\pi}{4}} \quad k = 0, 1, \ldots, N-1 \qquad \text{Equation 3}$$

where: n=0 to N−1 and k=0 to N−1.

This implies that the DFT of this particular LFM signal results in an equivalent LFM signal except for a scaling of √N and a π/4 phase shift. The functional form of the signal is the same in the time and frequency domains.

Figure 4:
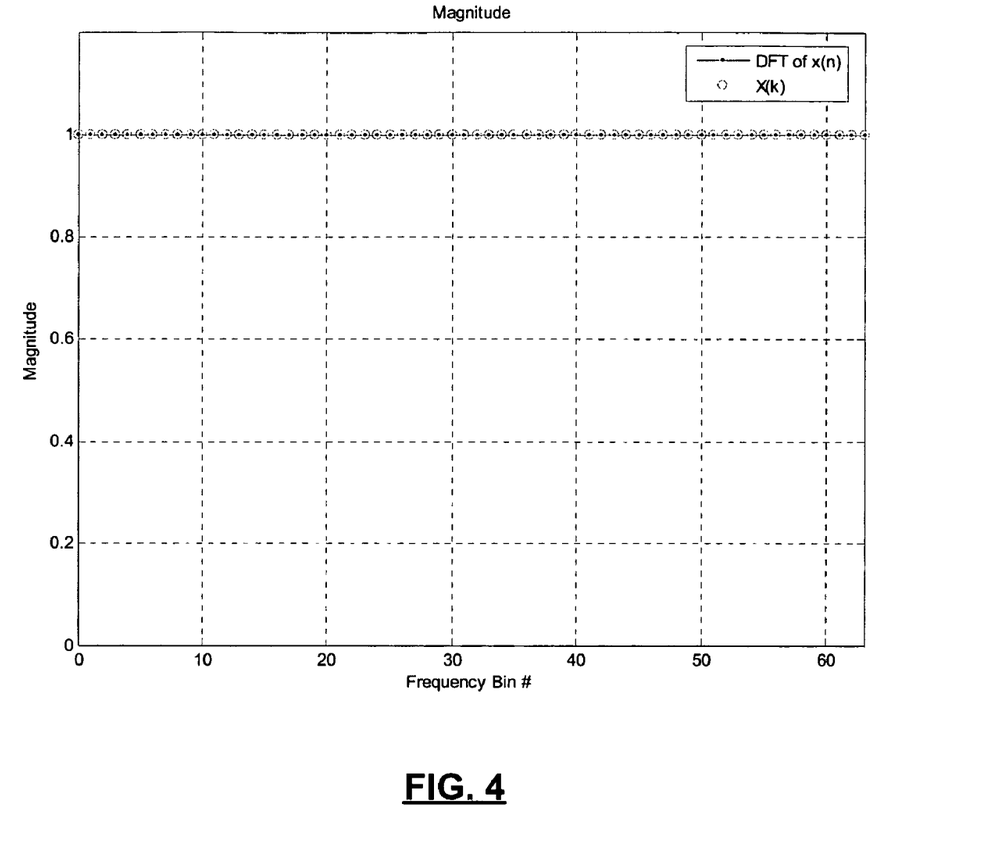
FIG. 4 is a graph plotting the normalized magnitude response of X(k) and of the Discrete Fourier Transform (DFT) of x(n)
Figure 5:
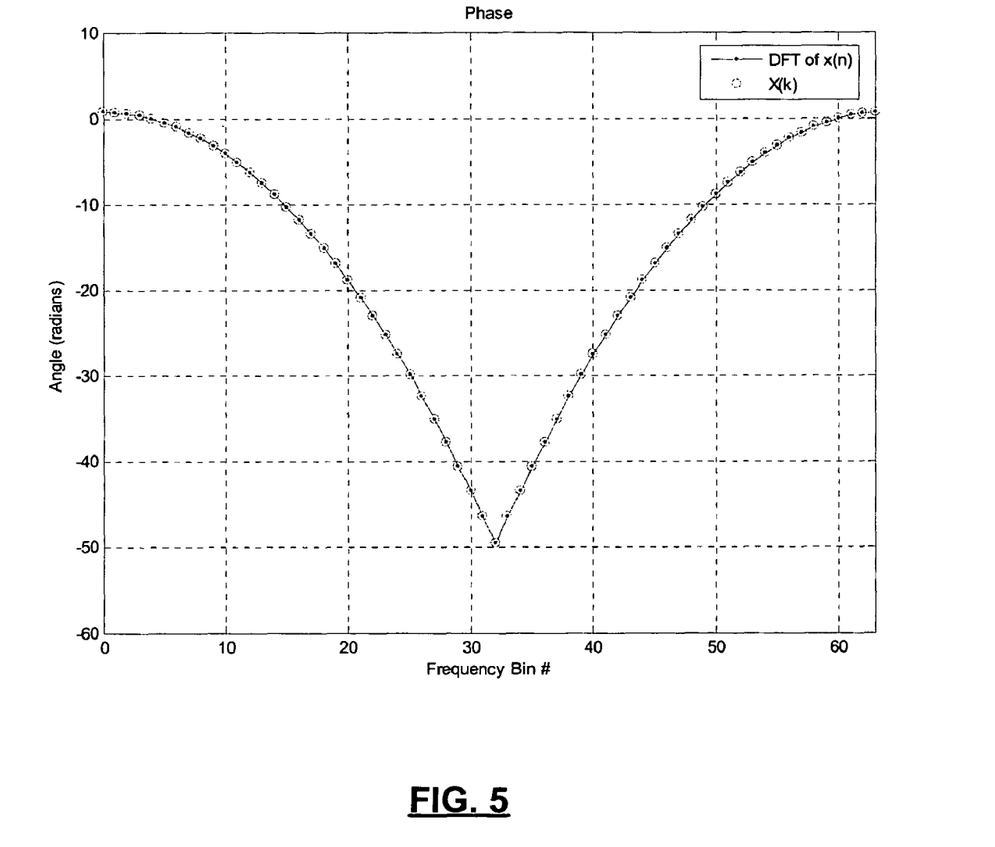
FIG. 5 is a graph plotting the phase response of X(k) and of the Discrete Fourier Transform (DFT) of x(n)

This can be seen in the magnitude and phase responses of the DFT of x(n) and X(k) as shown in FIGS. 4 and 5, for N=64 (the magnitudes were normalized to 1 for the purpose of illustration).

It should be noted that the phase of the signals extends beyond −π and π allowing one to see the quadratic nature of the curve.

x(n) is a specific case (v=N, $k_0$=0) of the more general LFM function, $$x'(n) = e^{j\pi\frac{vn^2}{N^2} + j2\pi\frac{k_0 n}{N}} \qquad \text{Equation 4}$$

where v can be considered the number of frequency bins over which the signal is swept, and $k_0$ the index of the sub-carrier corresponding to the start of the LFM sweep. For v=N, the DFT of x'(n) is $$X'(k) = X(k-k_0)_{mod\,N} \qquad \text{Equation 5}$$

where the spectrum of X(k) is circularly shifted by $k_0$ frequency bins.

Unfortunately, for v equal to anything other than N, the quadratic phase modulation represented by Equation 3 in the frequency domain no longer applies. It can, however, be shown to be a reasonable approximation, especially for an efficient generation of synchronization signals for OFDM based communications systems applications.

With the appropriate scaling, the DFT of x'(n) is approximated by $$X'(k+k_0)_{modN} \approx X''(k+k_0)_{modN} \qquad \text{Equation 6}$$
$$= \begin{cases} \frac{N}{\sqrt{v}} e^{-j\frac{\pi}{v}k^2 + j\frac{\pi}{4}} & k = 0, 1, \ldots, v-1 \\ 0 & \text{otherwise} \end{cases}$$

for v≠n.

Figure 6:
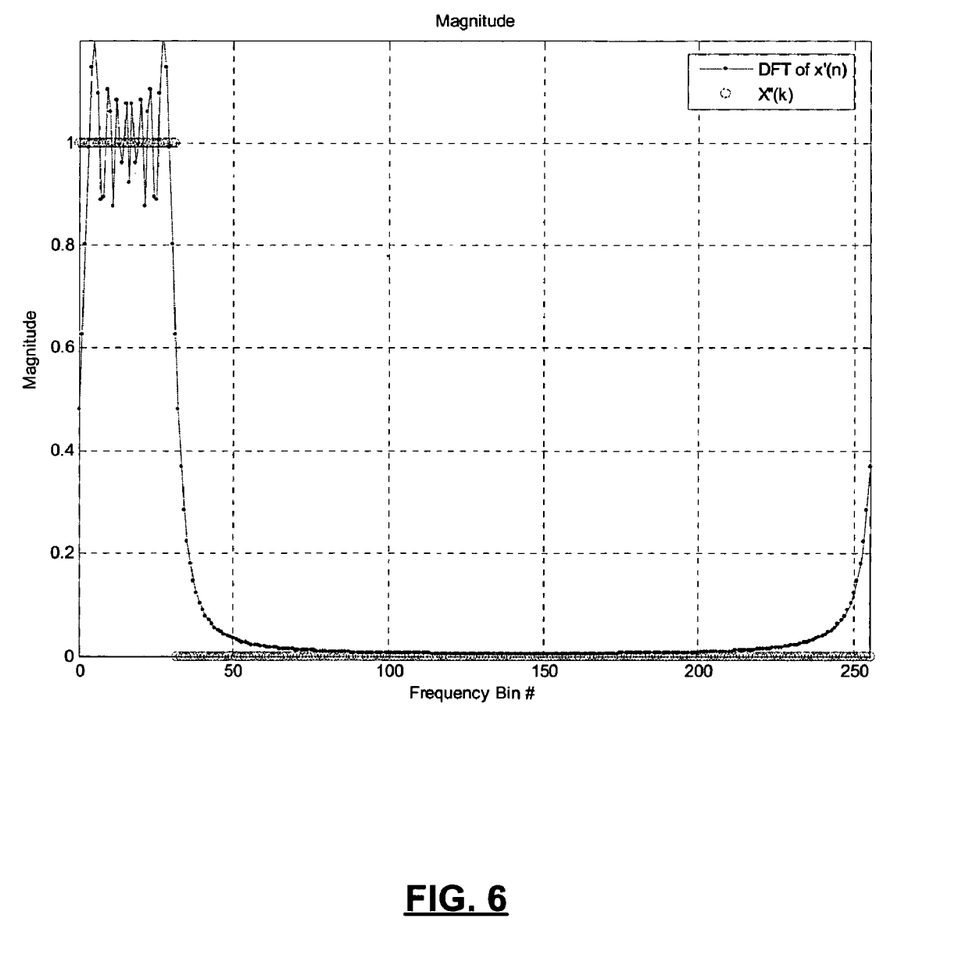
FIG. 6 is a graph plotting the normalized magnitude response of X"(k) and of the Discrete Fourier Transform (DFT) of x'(n), where the bandwidth that is swept (v=32) is less than the entire available bandwidth (N=256) and where $k_0$=0.
Figure 7:
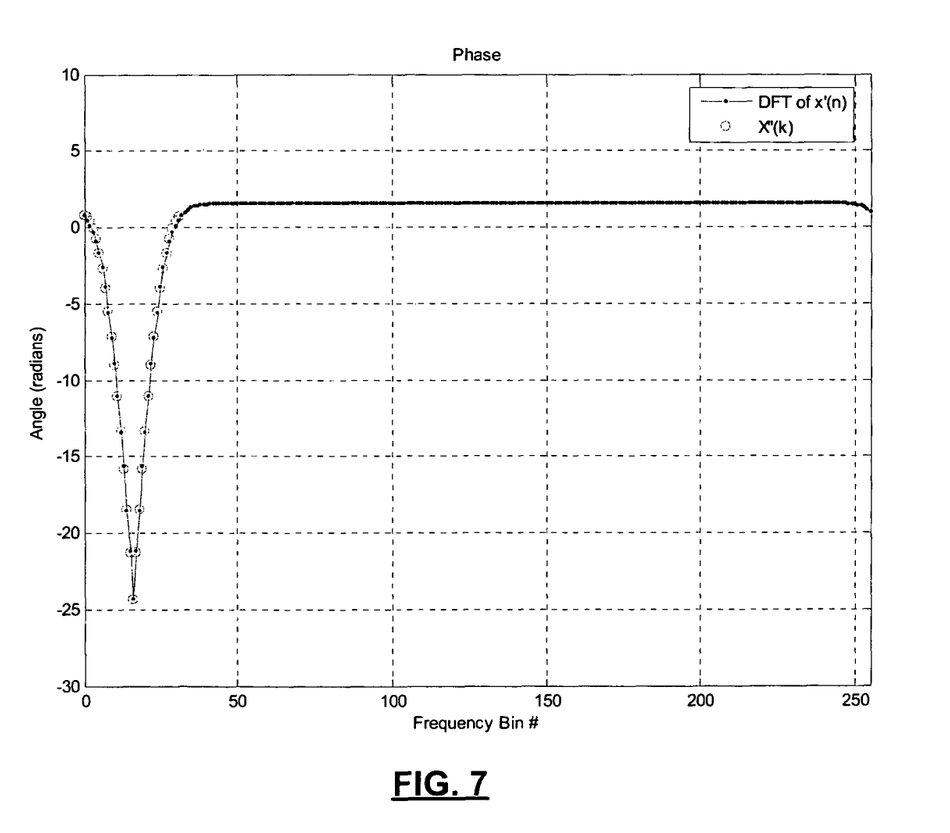
FIG. 7 is a graph plotting the phase response of X"(k) and of the Discrete Fourier Transform (DFT) of x'(n), where the bandwidth that is swept (v=32) is less than the entire available bandwidth (N=256) and where $k_0$=0.
Figure 8:
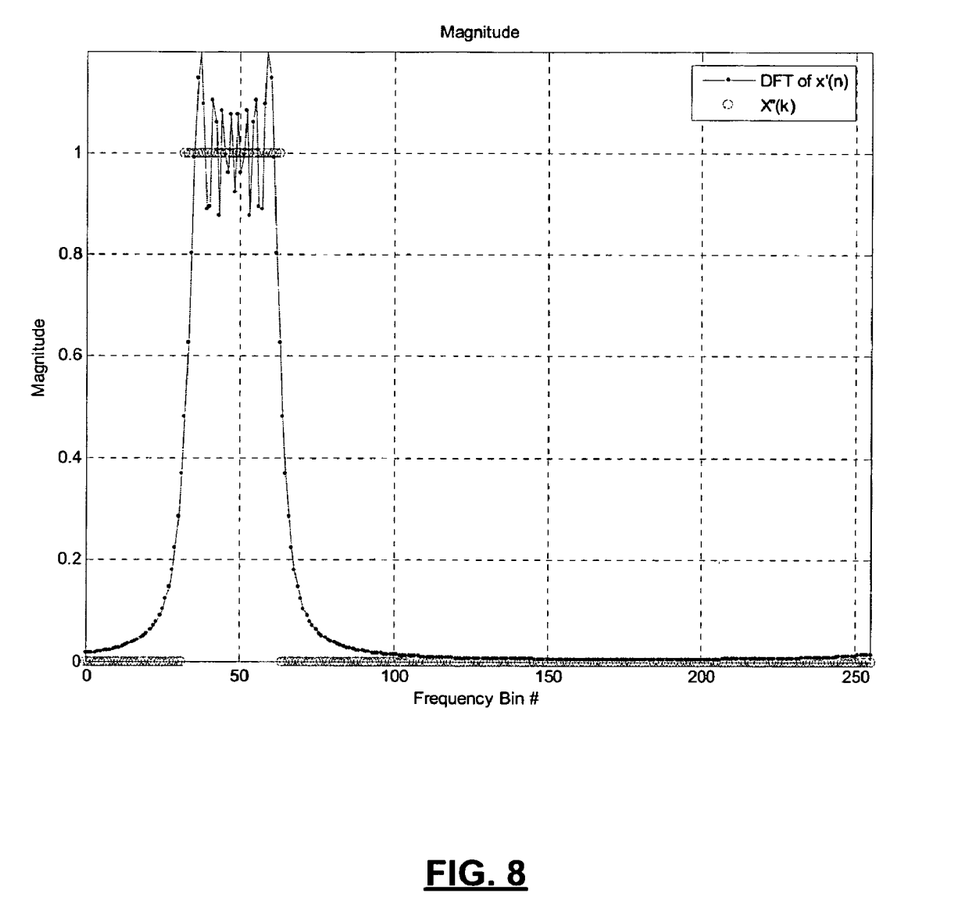
FIG. 8 is a graph plotting the normalized magnitude response of X"(k) and of the Discrete Fourier Transform (DFT) of x'(n), where the bandwidth that is swept (v=32) is less than the entire available bandwidth (N=256) and where $k_0$=32.
Figure 9:
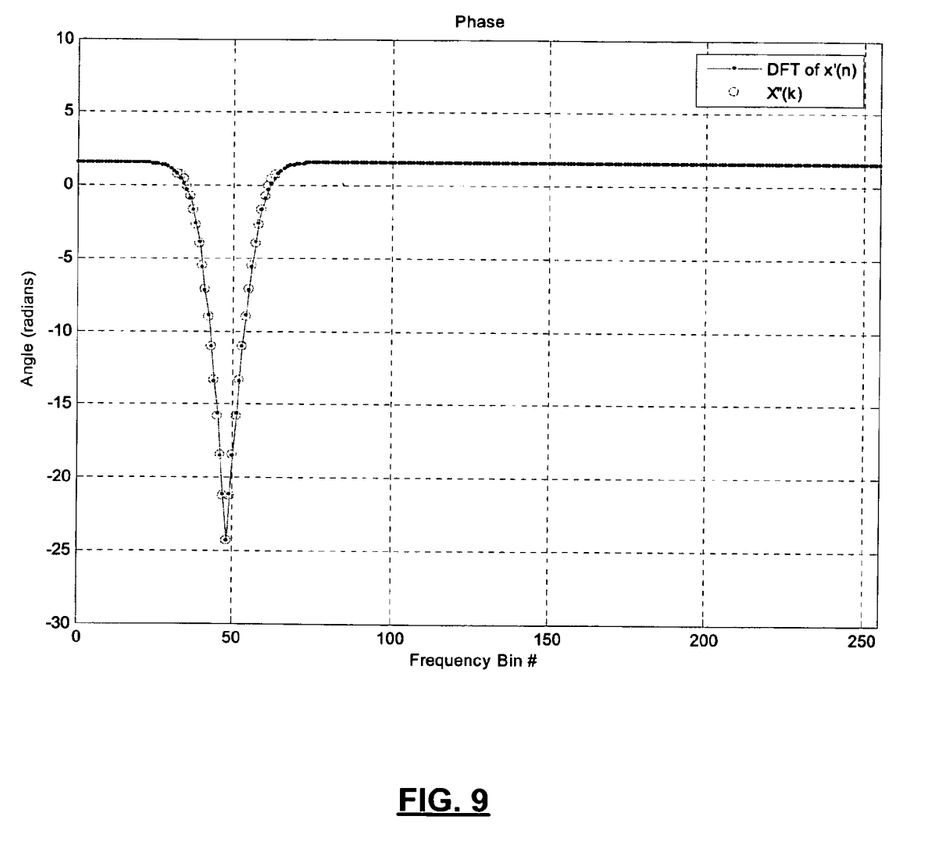
FIG. 9 is a graph plotting the phase response of X"(k) and of the Discrete Fourier Transform (DFT) of x'(n), where the bandwidth that is swept (v=32) is less than the entire available bandwidth (N=256) and where $k_0$=32.

FIGS. 6 and 7 illustrate the effect of limiting the bandwidth that is swept (v) to less than the entire bandwidth (N) for Equation 6. In this case, N=256, v=32 and $k_0$=0. FIGS. 8 and 9 show the effect of limiting the width of the LFM sweep to v=32 and offseting the start of the sweep by $k_0$=32.

Note that the coefficients are just rotated which hints at an efficient implementation.

The phase response of Equation 6 is a much better approximation to the phase response of the DFT of x'(n) than the corresponding magnitude responses.

The synchronization symbols for an OFDM preamble can be generated in the time domain or the frequency domain. In either case, it is desirable to use quadratic phase modulation (in time or across frequency) to generate the symbols using the formula of either Equation 4 or Equation 6, respectively. If the quadratic phase modulated symbol is generated in the frequency domain, an IFFT is used to convert the signal to the time domain before it is transmitted. If the LFM synchronization symbols are generated directly in the time domain using Equation 4, this results in a power spectral density that is not constant. If the synchronization symbols are generated in the frequency domain using Equation 6, the power spectral density is constant across the swept band. For an OFDM based communications system, it is desirable to have a constant power spectral density across the swept frequency band.

Look-Up-Table (LUT) Implementation

Figure 10:
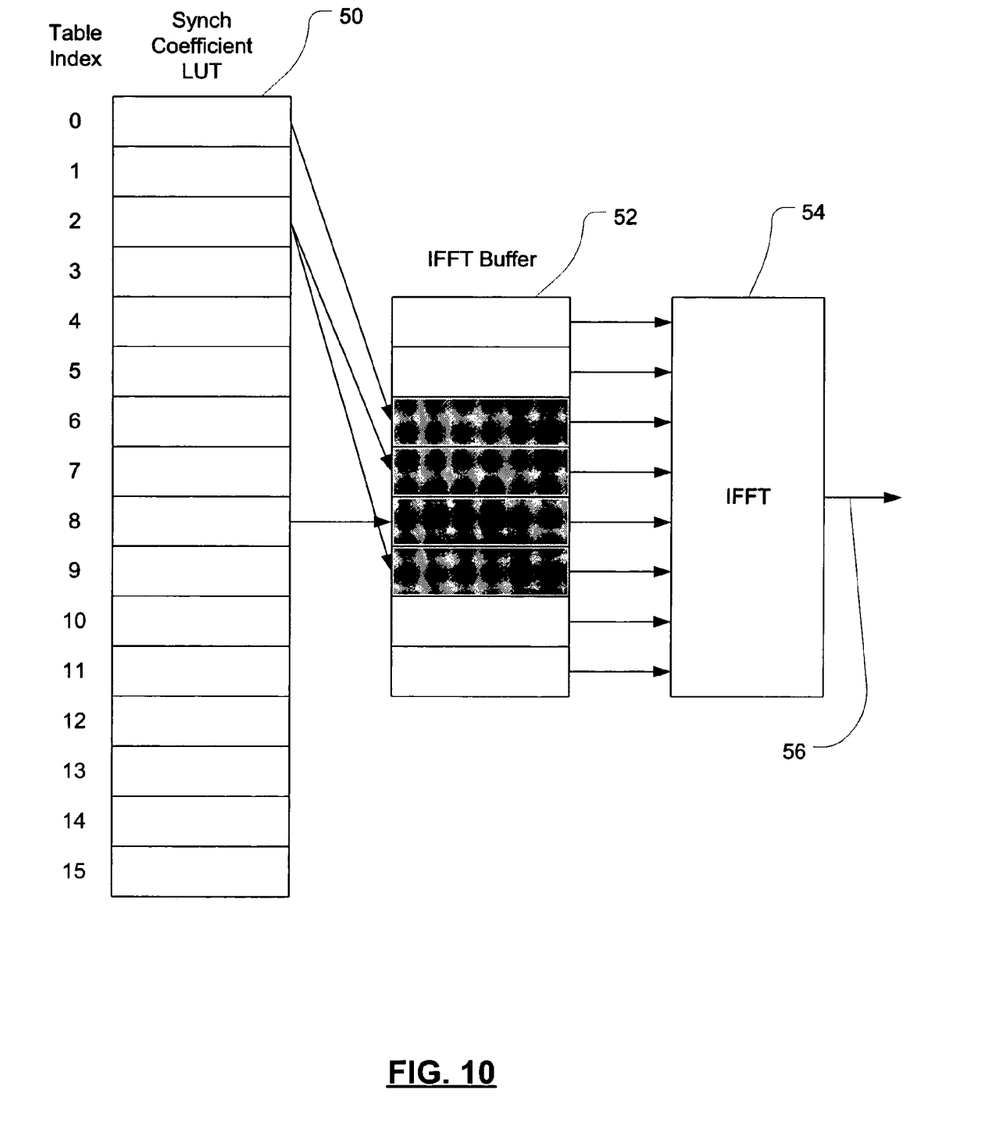
FIG. 10 depicts the use of a single LUT to generate the LFM synchronization symbols.

In accordance with one embodiment of the invention, a very efficient method of using a look-up table is provided for configuring any frequency band with appropriate coefficients based on the LFM approximation of Equation 6 for an appropriate selection of configurable bandwidths. Note that in equation 6 the angle argument is always an integer multiple of π/N providing that v divides evenly into N. Consequently a 2N value look up table (LUT) can be constructed to precisely generate the frequency domain LFM values of equation 6, as shown in FIG. 10. In this example, a synchronization coefficient LUT 50 has a table index of 0 to 15 (i.e. 2N=16, N=8), which provides circular modulo (2N) indexing for the LUT. An IFFT buffer 52 temporarily stores the LUT coefficients for inverse FFT processing by an IFFT filter 54, which generates a LFM time series x(n) 56. In this example, it is assumed that N=8, $k_0$=2 and v=4. Once computed, the step size through the table is translated to a LUT table index of [0 2 8 2] (as per Equation 7, below) where the last index value (2) is the result of 18 modulo 16.

Figure 11:
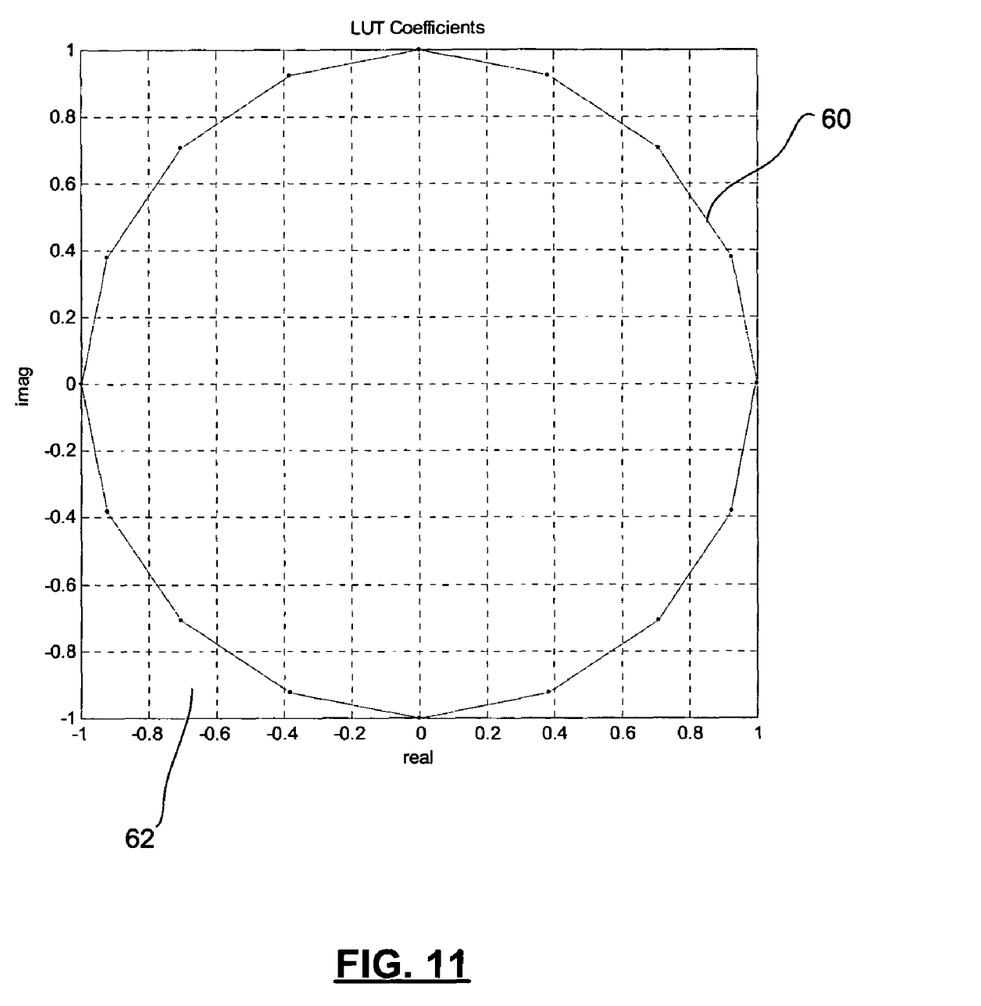
FIG. 11 depicts, in a complex plane, a unit circle from which 2N evenly spaced complex coefficients are derived to represent synch coefficients in a LUT.

The synchronization coefficient look-up table (LUT) represents 2N evenly spaced complex coefficients of the unit circle 60 as shown in FIG. 11. Note that any constant phase rotation of the coefficients is un-important. Also, because of the symmetry of the coefficients in the complex plane 62, the number of LUT elements could be reduced at the expense of some additional logic. Quadratic phase modulation is obtained by stepping through the LUT coefficients in a quadratic way (modulus 2N for a circular table) and mapping them to consecutive frequency sub-carriers with the first sub-carrier being $k_0$ as defined in Equation 7.

$$X'(k + k_0)_{modN} = LUT\left[\left(\frac{N}{v}k^2\right)_{modN}\right] k = 0, 1, \ldots, v-1 \quad \text{Equation 7}$$

Figure 12:
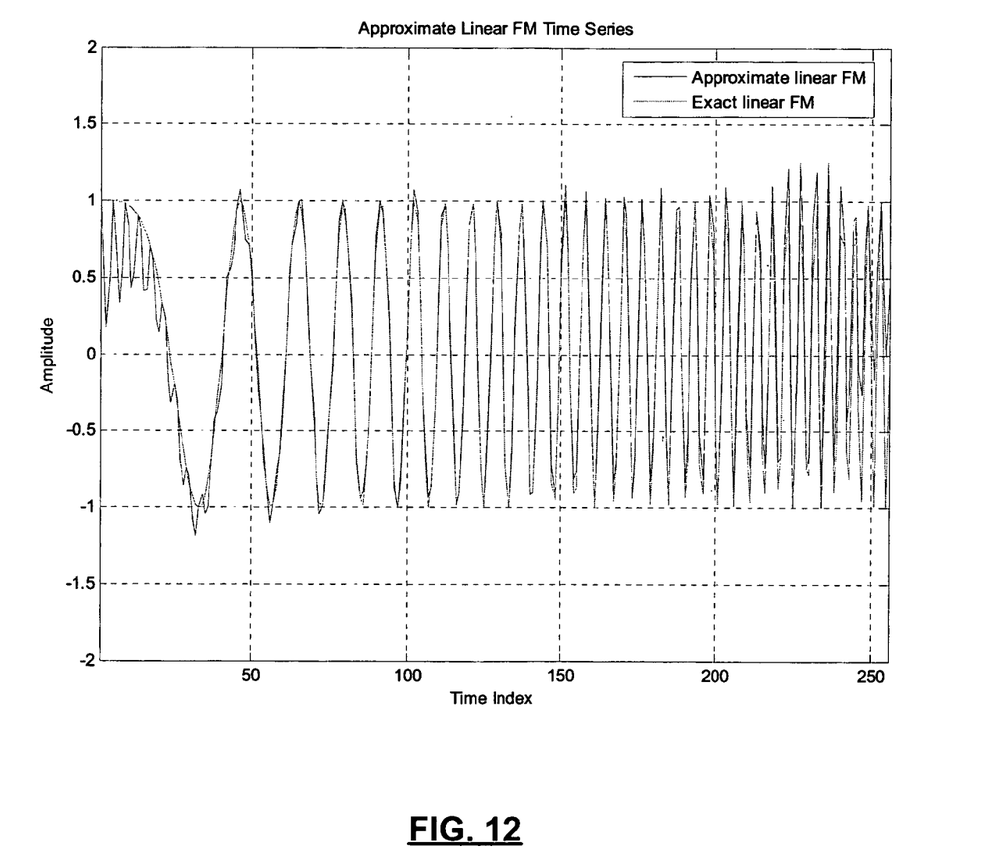
FIG. 12 is a time-domain representation of a approximated and exact synchronization symbol for N=256, v=64 and $k_0$=0.

The time series, such as the one shown in FIG. 12, can be generated by an IFFT. The time series can be made complex (in phase and quadrature) with the appropriate FFT architecture or real, depending on the type of signaling required. FIG. 12 illustrates the time domain representation of a synchronization symbol for N=256, v=64 taking a real part of the IFFT output. The exact LFM signal is included for comparison. It should be noted that in this case every N/v sample is equivalent.

Using a configurable bandwidth specified by a value of v that divides evenly into N results in precise quadratic phase modulation across frequency sub-carriers in all cases.

In practice, if N is large enough, the configurable bandwidth can be specified by a value of v that does not divide evenly into N. In this case the LUT index value calculated by equation 7 may be non integer and the LUT value can be determined by some interpolation technique (including nearest neighbor interpolation which amounts to rounding LUT index). Reductions in LUT size can be obtained using methods like CORDIC approximations for sine and cosine functions. As is known in the art, CORDIC (COordinate Rotation DIgital Computer) functions constitute a simple and efficient algorithm to calculate hyperbolic and trigonometric functions.

Other Implementations

Time Domain $$x'(n) = e^{j\pi \frac{vn^2}{N^2} + j2\pi \frac{k_0 n}{N}}, \quad \text{Equation 4,}$$

can be employed to generate the synchronization symbols directly in the time domain using a microprocessor (CPU, ALU, floating point co-processor . . . ) and known methods (series expansions, look-up table, CORDIC functions, etc.). For a bandwidth-configurable system, the parameters are modified for the different bandwidths (v) and starting frequencies ($k_0$). This results in a power spectral density that is not constant (but can be flattened with appropriate windowing and filtering). For a system where latency when switching configurations is an issue, i.e. bandwidth configurable "on the fly", having better control over the power spectral density and having an ability to turn off sub-carriers that may be interfering with sensitive equipment or violating emissions limits as set by MIL-STD-461e and FCC part 15, there are more suitable ways to generate synchronization symbols.

Efficient Look-Up Table Implementation

In accordance with one embodiment of the invention, an efficient LUT implementation for generating synchronization symbols in the time domain is possible when the limitations described above are not an issue. A time domain LUT with 2N point complex samples is generated using the formula:

$$LUT(m) = e^{j\frac{\pi}{N}m^2} \quad m = 0, 1, \ldots ; 2N-1 \quad \text{Equation 8}$$

The time domain signal can be generated by indexing the LUT according to the following equation:

$$x(n) = LUT\left[\left(\text{round}\left(\frac{v}{N}n^2\right) + 2k_0 n\right)_{mod2n}\right] \quad \text{Equation 9}$$

$$n = 0, 1, \ldots, N-1$$

which combines linear indexing through the table to generate the carrier frequency with quadratic indexing through the table to generate the linear frequency modulation.

Figure 13:
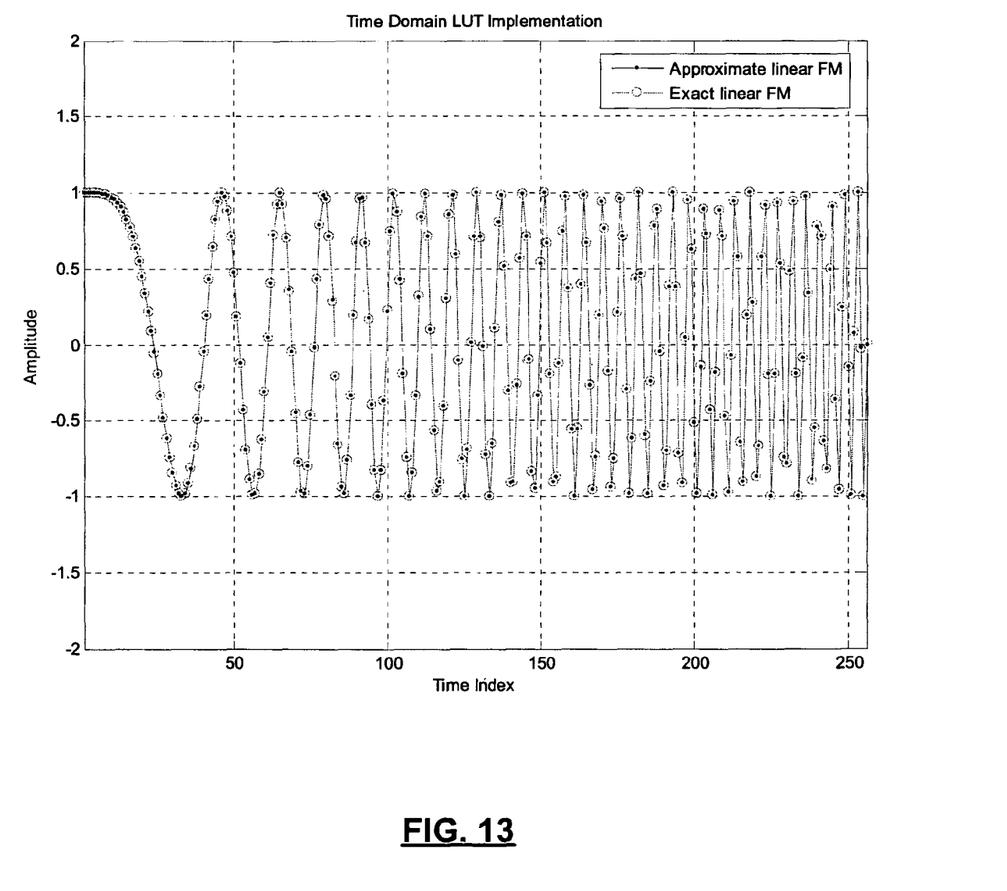
FIG. 13 is a time-domain representation of the approximated and exact LFM signals for N=256, v=64 and k0=0.

The rounding function is required because there are not enough coefficients to precisely describe the LFM modulation in the time domain. Instead of the rounding to obtain an integer LUT index, the LUT can be interpolated. In any case, the approximation is suitable for most applications and the LUT can be further reduced if accuracy requirements permit it. FIG. 13 illustrates the approximate LFM signal generated in the time domain using this method for N=256, v=64, taking the real part. The exact LFM signal is included for comparison.

Frequency Domain

Directly $$X(k) = \frac{N}{\sqrt{v}} e^{-j\frac{\pi}{v}k^2}, \quad \text{Equation 6}$$

(for k=0 to v-1, X(k)=0 otherwise, ignoring π/4 phase rotation) can be employed to generate the synchronization symbols using a microprocessor (CPU, ALU, floating point co-processor, etc.) directly in the frequency domain using known methods (series expansions, LUT, CORDIC functions, etc.). For a bandwidth configurable system, the parameters are modified for the different bandwidths (v) and starting frequencies ($k_0$). The time domain signal is generated using an IFFT.

Figure 14:
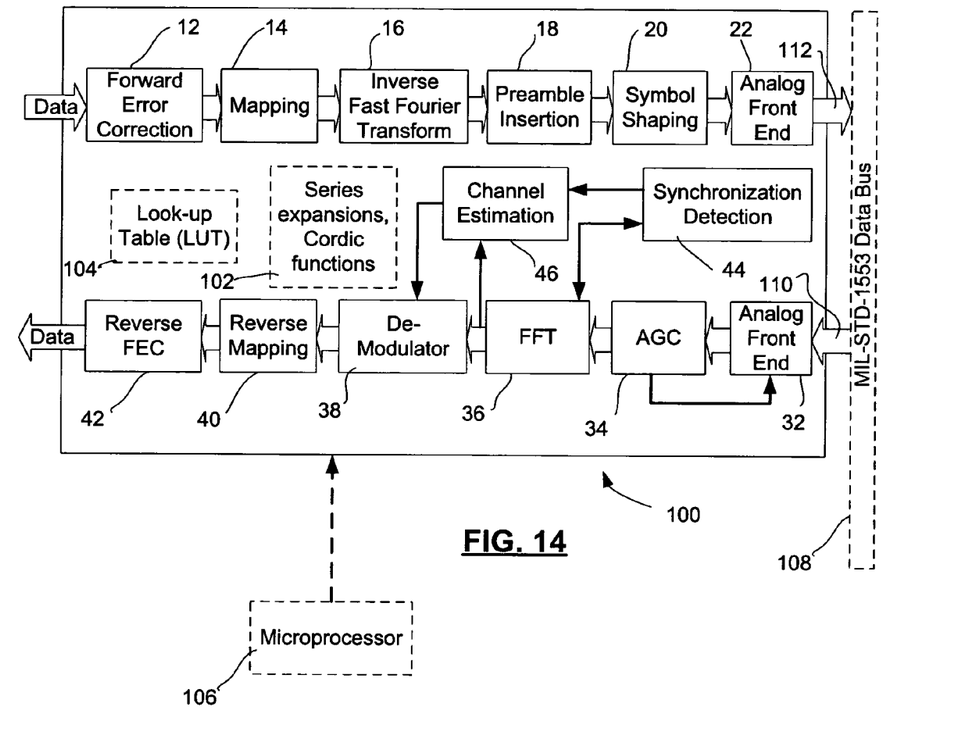
FIG. 14 is a schematic diagram of a bandwidth-configurable modem in accordance with the invention.

FIG. 14 is a block diagram of a bandwidth-configurable OFDM modem 100 having logic circuits for generating synchronization symbols in accordance with embodiments of the invention. All of the components of the modem 100 are identical to those described above with reference to FIGS. 1 and 3 and their descriptions will not be repeated for that reason. In addition, the modem 100, or a microprocessor 106 associated with the modem 100, is provisioned with algorithms for performing series expansions and/or Coordinate Rotational Digital Computer (CORDIC) functions 102, and/or a look-up table 104 for generating synchronization symbols using the method in accordance with the invention, as described above in detail. The microprocessor 106 may be an integral part of the modem 100 or part of an auxiliary unit. The bandwidth used by the modem 100 may be statically configured using hardware or software control parameters in a manner known in the art. The bandwidth used by the modem may also be configured "on the fly" by downloading values for N and v via a modem control channel (not shown). The analog front end 22 of the transmitter and the analog front end 32 of the receiver are, in accordance with one embodiment of the invention, interfaced with a MIL-STD-1553 data bus via bus couplers 110, 112, respectively.

The main benefit is that the LFM synchronization signal will be swept only over the configured bandwidth for the duration of the symbol. This results in a peak to average power that is constant and independent of the configured bandwidth. This also permits the inclusion of a sub-carrier mask to turn off selected tones in the configured bandwidth as required.

In the foregoing description of the invention, the variable "v" in the equations is understood to be a positive integer. Consequently, the equations describe an LFM that sweeps from a low frequency to a high frequency. However, with minor modifications obvious to one skilled in the art, those equations can be modified to describe an LFM that sweeps from a high frequency to a low frequency.

The embodiment(s) of the invention described above is (are) intended to be exemplary only. The scope of the invention is therefore intended to be limited solely by the scope of the appended claims.

What is claimed is:

1. Within a bandwidth configurable modem, a method of generating synchronization symbols for a transmitted waveform, comprising:
   selecting a frequency sub-band for which synchronization symbols are desired, said sub-band comprising v frequency bins with associated frequency sub-carriers; and
   generating synchronization symbols as a discrete time domain LFM signal x'(n) with signal values obtained using the equation:

$$x'(n) = e^{j\pi \frac{vn^2}{N^2} + j2\pi \frac{k_0 n}{N}}$$

where: N is the length of the signal in samples; n=0 to N−1; and $k_0$ is the sub-carrier index corresponding to the first frequency bin within the selected sub-band.

2. The method as claimed in claim 1 further comprising generating the synchronization symbols directly in the time domain using a microprocessor to perform one of series expansions and CORDIC functions.

3. The method as claimed in claim 1 further comprising generating a time domain look-up table (LUT) with 2N point complex samples, comprising:
   using the equation $$LUT(m) = e^{j\frac{\pi}{N}m^2} \quad m = 0, 1, \ldots, 2N-1$$

to compute the 2N point complex samples to populate the LUT.

4. The method as claimed in claim 3 further comprising generating a time domain signal by indexing the LUT using the equation:

$$x(n) = LUT\left[\left(\text{round}\left(\frac{v}{N}n^2\right) + 2k_0 n\right)_{\text{mod} 2n}\right] \quad n = 0, 1, \ldots, N-1.$$

5. Within a bandwidth configurable modem, a method of generating synchronization symbols for a transmitted waveform, comprising:
   selecting a frequency sub-band for which synchronization symbols are desired, said sub-band comprising v frequency bins with associated frequency sub-carriers;
   generating synchronization symbols in a frequency domain using the approximation equation:

$$X'(k+k_0)_{\text{mod}N} \approx X''(k+k_0)_{\text{mod}N} = \begin{cases} \frac{N}{\sqrt{v}} e^{-j\frac{\pi}{v}k^2 + j\frac{\pi}{4}} & k = 0, 1, \ldots, v-1 \\ 0 & \text{otherwise} \end{cases}$$

where: N is the number of sub-carrier frequencies for the entire bandwidth; and $k_0$ is the index of the sub-carrier corresponding to the first frequency bin within the selected sub-band; and
   using an inverse fast Fourier transform (IFFT) to convert synchronization symbols to a time domain before the waveform is transmitted.

6. The method as claimed in claim 5 further comprising generating the synchronization symbols directly in the frequency domain using a microprocessor to perform one of series expansions and CORDIC functions.

7. The method as claimed in claim 5 further comprising generating a frequency domain look-up table (LUT) wherein LUT synchronization coefficients are represented by 2N evenly spaced complex coefficients of a unit circle.

8. The method as claimed in claim 7 further comprising generating a frequency domain signal by mapping LUT synchronization coefficients to consecutive frequency sub-carriers, using the equation:

$$X'(k+k_0)_{\text{mod}N} = LUT\left[\left(\frac{N}{v}k^2\right)_{\text{mod}N}\right] \quad k = 0, 1, \ldots, v-1.$$

wherein $k_0$ represents a first sub-carrier and v is the number of frequency bins over which the signal is swept.

9. A bandwidth-configurable modem adapted to generate synchronization symbols comprising:
   logic circuits that select a frequency sub-band for which synchronization symbols are desired, said sub-band comprising v frequency bins with associated frequency sub-carriers; and logic circuits that generate synchronization symbols as a time domain LFM signal x'(n) with signal values obtained by using the equation:

$$x'(n) = e^{j\pi \frac{vn^2}{N^2} + j2\pi \frac{k_0 n}{N}}$$

where: N is the length of the signal in samples; n=0 to N−1; and $k_0$ is the sub-carrier index corresponding to the start of the sweep first frequency bin within the selected sub-band.

10. The bandwidth-configurable modem as claimed in claim 9 wherein the logic circuits comprise a microprocessor to perform one of series expansions and CORDIC functions for generating the synchronization symbols directly in the time domain.

11. The bandwidth-configurable modem as claimed in claim 9 wherein the logic circuits comprise a time domain look-up table (LUT) with 2N point complex samples populated by using the equation:

$$LUT(m) = e^{j\frac{\pi}{N}m^2} \quad m = 0, 1, \cdots, 2N-1.$$

12. The bandwidth-configurable modem as claimed in claim 11 wherein the logic circuits generate a time domain signal by indexing the LUT using the equation:

$$x(n) = LUT\left[\left(\text{round}\left(\frac{v}{N}n^2\right) + 2k_0 n\right)_{\text{mod} 2n}\right] \quad n = 0, 1, \cdots, N-1.$$

13. The bandwidth-configurable modem as claimed in claim 9 further comprising a bus coupler for interfacing with a MIL-STD-1553 data bus.

14. A bandwidth-configurable modem adapted to generate synchronization symbols comprising:
   logic circuits that select a frequency sub-band for which synchronization symbols are desired, said sub-band comprising v frequency bins with associated frequency sub-carriers;
   logic circuits that generate synchronization symbols in a frequency domain using the approximation equation:

$$X'(k+k_0)_{mod N} \approx X''(k+k_0)_{mod N} = \begin{cases} \frac{N}{\sqrt{v}} e^{-j\frac{\pi}{v}k^2+j\frac{\pi}{4}} & k=0,1,\cdots,v-1 \\ 0 & \text{otherwise} \end{cases}$$

where: N is the number of sub-carrier frequencies for the entire bandwidth;
   and $k_0$ is the index of the sub-carrier corresponding to the first frequency bin within the selected sub-band; and
   logic circuits for performing an inverse fast Fourier transform (IFFT) to convert synchronization symbols to a time domain before the waveform is transmitted.

15. The bandwidth-configurable modem as claimed in claim 14 wherein the logic circuits comprise a microprocessor to perform one of series expansions and CORDIC functions for generating the synchronization symbols directly in the frequency domain.

16. The method as claimed in claim 14 wherein the logic circuits comprise a frequency domain look-up table (LUT) adapted to store LUT synchronization coefficients that are represented by 2N evenly spaced complex coefficients of a unit circle.

17. The bandwidth-configurable modem as claimed in claim 16 wherein the logic circuits generate a frequency domain signal by mapping LUT synchronization coefficients to consecutive frequency sub-carriers, using the equation:

$$X'(k+k_0)_{mod N} = LUT\left[\left(\frac{N}{v}k^2\right)_{mod N}\right] \quad k=0,1,\cdots,v-1$$

wherein $k_0$ represents a first sub-carrier and v is the number of frequency bins over which the signal is swept.

18. The bandwidth-configurable modem as claimed in claim 14 further comprising a bus coupler for interfacing with a MIL-STD-1553 data bus.

* * * * *